United States Patent [19]

Singbartl

[11] Patent Number: 5,896,029
[45] Date of Patent: Apr. 20, 1999

[54] ARRANGEMENT FOR FIXING THE POSITION OF A COIL CARRIER IN A HOUSING

[75] Inventor: Günther Singbartl, Hannover, Germany

[73] Assignee: WABCO GmbH, Hannover, Germany

[21] Appl. No.: 08/955,237

[22] Filed: Oct. 21, 1997

[30] Foreign Application Priority Data

Oct. 25, 1996 [DE] Germany ............ 196 44 379

[51] Int. Cl.⁶ ...................................... G01P 3/48
[52] U.S. Cl. ...................................... 324/173; 336/92
[58] Field of Search .................. 336/92, 94, 96, 336/98, 100, 105, 65, 67, 68; 337/112, 121, 327; 324/173, 174

[56] References Cited

U.S. PATENT DOCUMENTS

| 4,114,819 | 9/1978 | Kanki et al. ............. 242/18 R |
| 5,341,117 | 8/1994 | Singbartl . |
| 5,426,844 | 6/1995 | Suda et al. . |
| 5,563,510 | 10/1996 | Gorrell et al. ............. 324/174 |
| 5,744,951 | 4/1998 | Babin et al. ............. 324/173 |

FOREIGN PATENT DOCUMENTS

| 0 384 014 B 1 | 8/1990 | European Pat. Off. . |
| GM 72 02 730 | 1/1972 | Germany . |
| 23 44 312 A 1 | 3/1975 | Germany . |
| 25 01 610 A 1 | 7/1976 | Germany . |
| 33 32 545 A 1 | 4/1985 | Germany . |
| 36 28 585 A 1 | 3/1988 | Germany . |
| 37 02 736 C2 | 8/1988 | Germany . |
| 42 31 115 A1 | 3/1994 | Germany . |
| 43 24 560 A 1 | 1/1995 | Germany . |
| 43 24 557 A 1 | 2/1995 | Germany . |
| 43 31 795 A 1 | 3/1995 | Germany . |
| 43 31 969 A 1 | 3/1995 | Germany . |
| 43 40 177 A 1 | 6/1995 | Germany . |
| 44 41 889 A1 | 6/1995 | Germany . |
| 44 05 438 A1 | 8/1995 | Germany . |
| 44 18 570 A1 | 11/1995 | Germany . |
| 44 38 763 A 1 | 5/1996 | Germany . |
| 44 44 718 A 1 | 6/1996 | Germany . |
| 195 04 820 C 1 | 7/1996 | Germany . |

*Primary Examiner*—Lincoln Donovan
*Attorney, Agent, or Firm*—Proskauer Rose LLP

[57] ABSTRACT

An arrangement for fixing the position of a coil carrier in a cup-shaped formed casing part between a base of the casing part and a closure part which attaches to the casing part, comprises at least one spring element located on the circumference of the coil carrier and extending away from the coil carrier at a right angle to the longitudinal axis of the coil carrier and towards a wall of the casing part. The spring element is sized and shaped so that it presses against the wall of the casing part, thereby elastically fixing the position of the coil carrier in the casing part. In a preferred embodiment, at least one rigid abutment is also provided on the coil carrier. The rigid abutment extends at a right angle to the longitudinal axis of the coil carrier and towards the wall of the casing part. The rigid abutment is sized and shaped to securely support the coil carrier against the wall of the casing part via the rigid abutment. The spring element and rigid abutment are positioned relative to each other so as to center the coil carrier in the casing part.

22 Claims, 2 Drawing Sheets

ARRANGEMENT FOR FIXING THE POSITION OF A COIL CARRIER IN A HOUSING

BACKGROUND OF THE INVENTION

The invention relates to an arrangement for fixing the position of a coil carrier in a cup-shaped formed casing part. The invention finds particular application in a magnetic sensor.

In the prior art magnetic sensor described in European Patent 0 384 014 B1 (U.S. Pat. No. 5,341,117), the coil carrier is housed in a cup-shaped formed casing part. The cup-shaped formed casing part is closed on one end, which is called the base, and fitted with a closure part on the other. Tongue-like elements are formed on the closure part, and these elements extend in the direction of the coil carrier. Each tongue-like element is provided with a triangular barb that has a shallow face and a steep face. The steep face extends at substantially right angles to the surface is of the coil carrier. The surface of the coil carrier is provided with asymmetrical ridges or grooves forming teeth that interact with the barbs in the manner of a locking connection. That is, the shallow faces of the barbs readily ride over the teeth as the closure part is forced onto the coil carrier. However, the steep faces of the barbs do not ride over the teeth in the opposite direction, thus preventing the closure part and coil carrier from separating.

The coil carrier and the closure part of the prior art arrangement are inserted as a subassembly into the cup-shaped formed casing part until the coil carrier is brought to bear upon the base of the cup-shaped formed casing part. Each tongue-like element is also provided with a rounded projection extending towards the wall of the cup-shaped formed casing part. The rounded projections of the tongue-like elements press against the wall of the cup-shaped formed casing part, so that the coil carrier is centered in the cup-shaped formed casing part.

The performance of the magnetic sensor degrades if the coil carrier does not remain accurately centered and fully inserted in the cup-shaped formed casing part. It is therefore an object of the present invention to improve on the prior art arrangement by providing a simple elastic mounting that absorbs the forces and vibrations exerted on the coil carrier of a magnetic sensor in normal use.

SUMMARY OF THE INVENTION

This object is achieved by means of the present invention which provides an arrangement for fixing the position of a coil carrier in a cup-shaped formed casing part element between a base of the casing part and a closure part attached to the casing part. The arrangement comprises at least one elastic abutment serving as a spring element located on the circumference of the coil carrier and extending away from the coil carrier at a right angle to the longitudinal axis of the coil carrier and towards a wall of the casing part. The spring element is sized and shaped so that it presses against the wall of the casing part, thereby elastically fixing the position of the coil carrier in the casing part without having to provide additional means on the closure part or on the casing part.

In a further development of the invention, a rigid abutment is provided across from each elastic abutment on the coil carrier. The coil carrier bears upon the wall of the cup-shaped formed casing part via this rigid abutment. The rigid abutments and the elastic abutments act in pairs as spacers so that the coil carrier is centered elastically in the casing part.

In a further development of the invention, the elastic and rigid abutments are formed as projections of the coil carrier. An elastic abutment may be formed by opening a channel in the direction of the longitudinal axis of the coil carrier. The elastic component is the relatively thin wall of the channel that faces outward towards the wall of the cup-shaped formed casing part.

In a further development of the-invention, the cup-shaped formed casing part is provided with a closure part, and an additional spring element is provided between this closure part and the coil carrier. This additional spring element braces the coil carrier against a base of the casing part, where a gap is formed between the coil carrier and an object sensed by the magnetic sensor.

The organization and operation of this invention will be understood from a consideration of detailed descriptions of illustrative embodiments which follow, when taken in conjunction with the accompanying drawings.

DETAILED DESCRIPTION OF THE INVENTION

Figure 1:
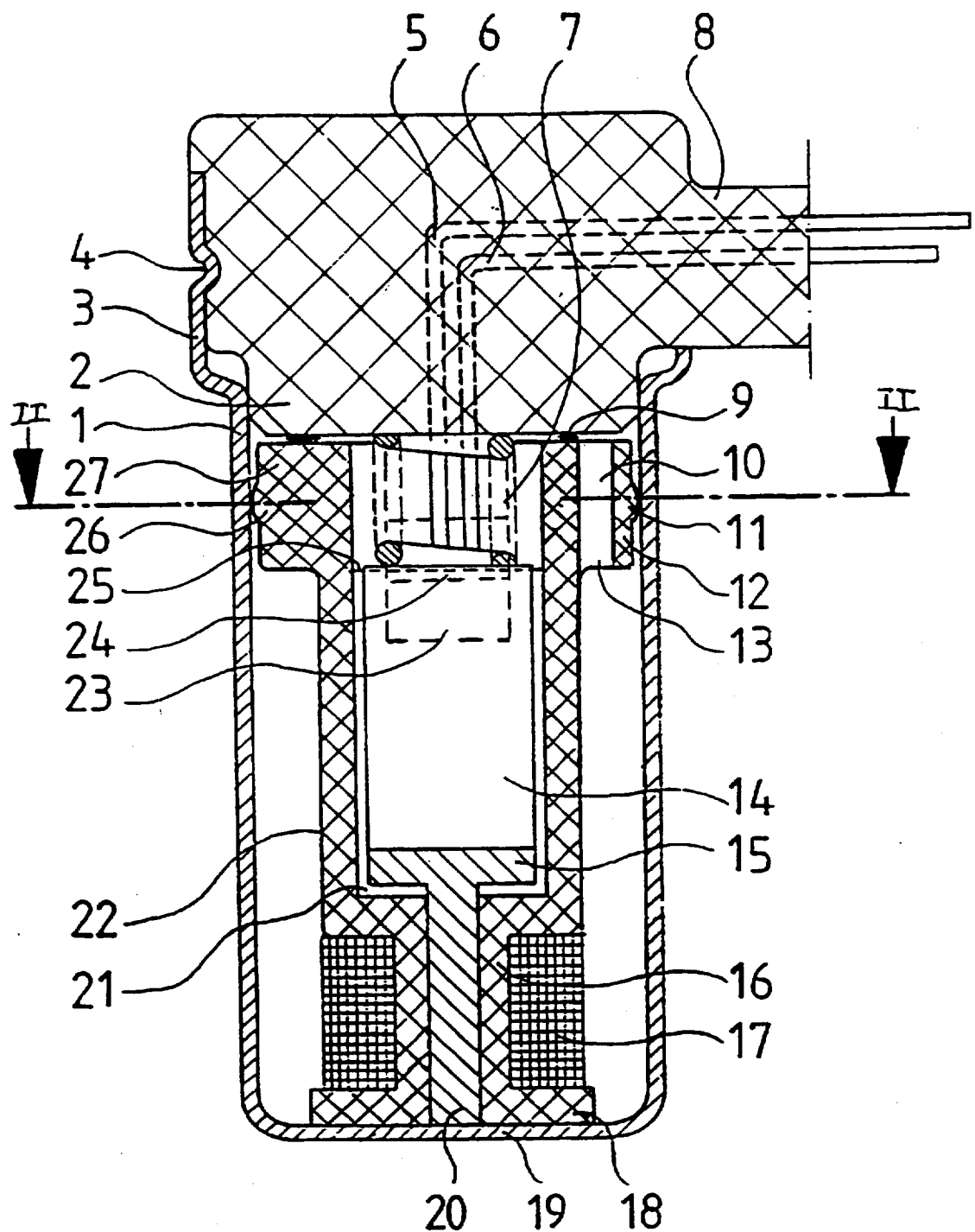
FIG. 1 shows a longitudinal section through a magnetic sensor having the inventive arrangement.

The magnetic sensor shown in FIG. 1 has a housing consisting of a cup-shaped formed casing part (1, 3, 19) and a closure part (2, 8). The cup-shaped formed casing part is provided with a base (19) and also has a collar (3) in its area across from the base (19) that serves to receive the closure part (2,8).

A cylindrically symmetric, stepped tubular coil carrier (22, 16, 18) is installed in the cup-shaped formed casing part (1, 3, 19). The coil carrier (22, 16, 18) is provided with a flange (18) extending radially to the outside on the end of the coil carrier (22, 16, 18) facing towards the base (19) of the cup-shaped formed casing part (1, 3, 19). A coil (17) is wound between the stepping and the flange (18), on the part (16) of the coil carrier (22, 16, 18) with the smallest diameter.

A cylindrically symmetric, stepped pole piece (15, 20) and an also cylindrically symmetric permanent magnet (14) are inserted in the coil carrier (22, 16, 18) in such manner that pole piece (15, 20) bears with its smaller face on the base (19) of the cup-shaped formed casing part (1, 3, 19). The permanent magnet (14) lies on the side of pole piece (15, 20) away form the base (19) and is in intimate contact with the head (15) of the pole piece. When the closure part (2, 8) and the coil carrier are pre-assembled outside the cup-shaped formed casing part (1, 13, 19), the head of the pole piece (15, 20) bears on the step in the interior (21) of the coil carrier. When the coil carrier and closure cap are inserted in the cup-shaped formed casing part, the shank (20) of the pole piece bears on the base (19) of the cup-shaped formed casing part (1, 3, 19) and the head of the pole piece is lifted from the step.

On the circumference of the coil carrier (22, 16, 18), on its end zone away from the base (19) of the cup-shaped formed casing part (1, 3, 19), four projections (13, 27, 28, 35) which are integrally formed parts of coil carrier (22, 16, 18) are provided. These four projections (13, 27, 28, 35) extend at right angles to the longitudinal axis of the coil carrier (22, 16, 18) in the direction of the wall of the cup-shaped formed casing part (1, 3, 19). FIG. 1 only shows two corner projections (13 and 27). Two pairs of corner projections (13 and 27) and (28 and 35) are located diagonally across from each other. Two of the corner projections (13 and 28) that are located on one half of the circumference of the coil carrier (22, 16, 18) are provided with channels (10 and 31) extending in the direction of the longitudinal axis of the coil carrier (22, 16, 18). The channels (10 and 31) are made in the form of rounded slots and are placed such that thin walls (12 and 29) are formed in the projections (13 and 27) directly across from the wall of the cup-shaped formed casing part (1, 3, 19). Each of these thin walls (12 and 29) has a raised area (11 and 30) that defines the area of contact between the coil carrier (22, 16, 18) and the wall of the cup-shaped formed casing part (1, 3, 19). In this manner, elastically deformable abutments serving as spring elements (12, 11 and 29, 30) are formed. The corner projections (27 and 35) provided on the other half of the circumference of the coil carrier (22, 16, 18) also have raised contacts (26 and 36) and serve as support bodies or rigid abutments (27, 26, 35, 36). The raised areas (11, 30, 26, 36) make it possible to define precisely the area of contact between the coil carrier (22, 16, 18) and the wall of cup-shaped formed casing part (1, 3, 19).

When the coil carrier (22, 16, 18) is inserted into the cup-shaped formed casing part (1, 3, 19), the flange (18) and the shank (20) of the pole piece (15, 20) bear on the base (19) of cup-shaped formed casing part (1, 3, 19). The coil carrier (22, 16, 18) is supported radially by the wall of the cup-shaped formed casing part through contact with the rigid abutments (27, 26 and 35, 36) and the elastic abutments (12, 11 and 29, 30). At the same time, the coil carrier (22, 16, 18) has a limited area of contact with the wall of the cup-shaped formed casing part (1, 3, 19) via the raised areas (1, 30, 26, 36). The rigid abutments and the elastic abutments are sized and positioned to hold the coil carrier (22, 16, 18) in place at the center of the cup-shaped formed casing part (1, 3, 19).

The closure part (2, 8) of the housing (1, 19, 3 2 8) is inserted in the widened collar area (3) of the cup-shaped formed casing part (1, 3, 19). On its side towards the coil carrier (22, 16, 18), the closure part (2, 8) has two tongue-like formations or splines (23 and 33) that extend in the direction of the coil carrier (22, 16, 18) parallel to its longitudinal axis. The splines (23, 33) of the closure part (2, 8) are located between the inner wall of the cup-shaped formed casing part (1, 3, 19) and the centering plate (22) of the coil carrier (22, 16, 18). FIG. 1 shows only one spline (23) indicated by a broken line.

Each of the splines (23 and 33) of the closure part (2, 8) has at least one nose-like projection or barb (24 or 34) that has a sloping side or flank extending towards the surface of coil carrier (22, 16, 18). The coil carrier (22, 16, 18) has at least one mating tooth (25 or 32) in the area of each of the splines (23 and 33). These teeth (25, 32) are on the circumference of the coil carrier (22, 16, 18) between each rigid abutment (27, 26 or 35, 36) and elastic abutment (12, 11 or 29, 30). The barb or barbs (24, 34) on each spline (23, 33) reach over the teeth (25, 32) on the coil carrier (22, 16, 18) and lock it to the closure part (2, 8).

At least one elastically deformable element serving as an additional spring element (9) is provided between the coil carrier (22, 16, 18) and the closure part (2, 8). This additional spring element (9) is made in the form of an annular body that is compressed as the closure part (2, 8) presses the additional spring element (9) and the coil carrier (22, 16, 18) against the base (19) of the cup-shaped formed casing part (1, 3, 19).

The closure part (2, 8) has a guide (8) for a cable or for strands (5 and 6) of a cable that allow the coil (17) to be connected to a control circuit located outside the housing (1, 19, 3, 2, 8) of the magnetic sensor.

Of course the splines (23 and 33) can also be located on the coil carrier (22, 16, 18) in such manner that they extend in the direction of the closure part (2, 8). In such an embodiment, the closure part (2, 8) must be extended in the direction of the coil carrier (22, 16, 18). The cross-section of that extension must be sized so that barbs on the splines projecting from the coil carrier can engage mating teeth on the extension of the closure part.

The cup-shaped formed casing part (1, 3, 19) and the closure part (2, 8) snap together as indentations (4) at certain locations on the wall of the cup-shaped formed casing part (1, 3, 19) fall into corresponding recesses in the wall of the closure part (2,8). Of course other suitable means can also be used to connect these two components.

A coil spring (7) is compressed between the closure part (2, 8) and the permanent magnet (14), which is placed in the larger bore of the stepped interior (21) of the coil carrier (22, 16, 18). The coil spring (7) pushes the permanent magnet (14) against the head (15) of the pole piece (15, 20). The shank (20) of the pole piece extends through the smaller bore inside the coil carrier and presses against the base (19) of the cup-shaped formed casing part (1, 3, 19).

Figure 2:
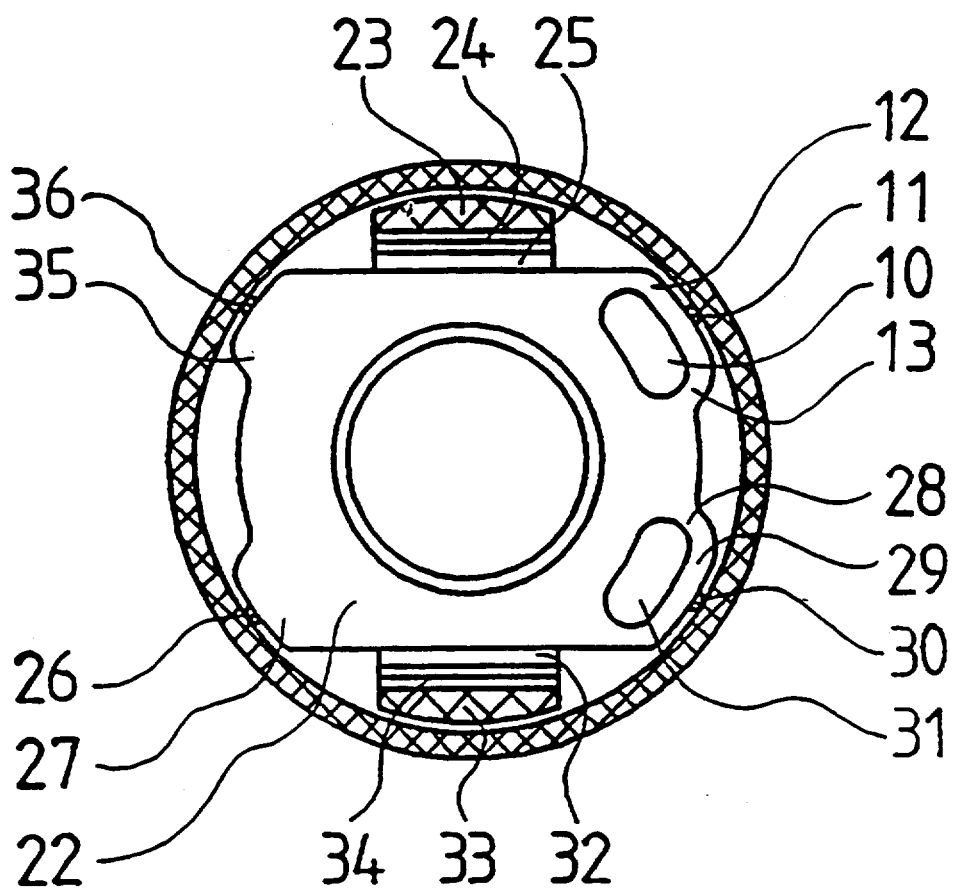
FIG. 2 shows a cross-sectional view of the magnetic sensor of FIG. 1 taken along line II—II.

FIG. 2 shows a cross-sectional view of the magnetic sensor perpendicular to its longitudinal axis taken along the line II—II indicated in FIG. 1. The arrangement of the corner projections (13 and 28) with the elastic abutments (12, 11 and 29, 30) can be clearly recognized on the right half of the circumference of the coil carrier (22, 16, 18). The arrangement of the projections (35 and 27) forming rigid abutments (27, 26 and 35, 36) on the left half of the circumference of the coil carrier (22, 16, 18) is also apparent. Elastic abutment (12, 11) is paired diagonally with rigid abutment (27, 26), and elastic abutment (29, 30) is paired diagonally with rigid abutment (35, 36).

The teeth (25 and 32) on the coil carrier (22, 16, 18) that form a snap connection with the barbs (24 and 34) on the splines (23 and 33) of the closure part (2, 8) are also visible in FIG. 2. These teeth (25 and 32) are located across from each other on the coil carrier (22, 16, 18) between one of the rigid abutments (27, 26 and 35, 36) and one of the elastic abutments (12, 11 and 29, 30). The barbs (24 and 34) and teeth (25 and 32) used in the snap connection can be provided on extensions of the coil carrier (22, 16, 18) and of the closure part (2, 8) or directly on these components.

The elastic abutments (12, 11 and 29, 30) can be connected in a detachable manner to the corner projections (13 and 28) or directly to the coil carrier (22, 16, 18). The rigid abutments (27, 26 or 35, 36) need not be formed on the coil carrier (22, 16, 18) but may also be separate components that are sprayed, cemented or screwed to the coil carrier.

The spring elements (12, 29) can also be leaf springs or springs of some other design extending either in the direction of the longitudinal axis of the coil carrier (22, 16, 18) or at right angles to it.

One elastic abutment and one rigid abutment placed opposite one another on the coil carrier (22, 16, 18) will hold it inside the cup-shaped formed casing part (1, 3, 19). In order to more accurately center the coil carrier (22, 16, 18) in the housing (1, 19, 3, 2, 8), however, it is advantageous to provide at least one elastic abutment and two rigid abutments or two elastic abutments and one rigid abutment. Providing raised areas (11, 30, 26, 36) on the springs (12 and 29) and the corner projections (27 and 35), although advantageous, is not absolutely necessary.

A preferred mode of assembly of the magnetic sensor described above is explained in further detail below.

Before placing the coil carrier (22, 16, 18) in the cup-shaped formed casing part (1, 3, 19), the cable with the strands (5, 6) is placed in the guide (8) of the closure part (2, 8). The pole piece (15, 20) and the permanent magnet (14) are inserted one after the other into the stepped interior (21) of the coil carrier. The coil spring (7) is then inserted into the coil carrier (22, 16, 18) last and rests on top of the permanent magnet (14). The closure part (2, 8) is then pushed onto the coil carrier (22, 16, 18) until the barbs (24 and 34) on the splines (23 and 33) engage the teeth (25 and 32) on the coil carrier (22, 16, 18). The closure part (2, 8) and the coil carrier (22, 16, 18) snap together as the barbs (24 and 34) reach over the teeth (25 and 32).

The process of joining together the closure part (2, 8) and the coil carrier (22, 16, 18) is facilitated in that the surfaces of the teeth (25 and 32) facing the closure part (2, 8) are gently inclined to the axis of the coil carrier (22, 16, 18). As a result, the splines (23 and 33) are elastically deformed and spread apart during the connecting process.

The coil carrier (22, 16, 18) and the closure part (2, 8) are held together against the force of the coil spring (7) by a snap connection. That is, the faces of the teeth (25 and 32) formed on the coil carrier (22, 16, 18) facing towards the base (9) of the cup-shaped formed casing part (1, 3, 19) are steeply inclined to the longitudinal axis. After the barbs (24, 34) ride up the gently inclined faces of the teeth (25, 32) and snap over the steeply inclined faces, the force of the coil spring (7) is insufficient to cause the barbs (24, 34) to spread the splines (23, 33) apart again.

The closure part (2, 8) and the coil carrier (22, 16, 18) compress the coil spring (7) between these two components. That is, the coil spring (7) pushes against the permanent magnet (14), which in turn pushes against the head (15) of the pole piece (15), which finally pushes against the step in the interior (21) of the coil carrier (22, 16, 18).

The sub-assembly comprising the closure part (2, 8) and the coil carrier (22, 16, 18) is inserted into the cup-shaped formed casing part (1, 3, 19) next. The raised areas (11, 30, 26, 36) on the abutments of the coil carrier (22, 16, 18) engage the wall of the cup-shaped formed casing part (1, 3, 19) as the coil carrier (22, 16, 18) passes through the collar (3) of the casing part (1, 3, 19) and into the smaller inside diameter (1) of the casing part. Each of the two elastic abutments (12, 11 or 29, 30) is compressed in the direction of the channel (10 or 31) of the corresponding corner projection (13 or 28) during the continued movement of the coil carrier (22, 16, 18) in the direction of the base (19) of the cup-shaped formed casing part (1, 3, 19). The coil carrier (22, 16, 18) is braced in the cup-shaped formed casing part (1, 3, 19) as the compression of the elastic abutments (12, 11 and 29, 30) forces the rigid abutments (27, 26 and 35, 36) against the wall of the cup-shaped formed casing part (1, 3, 19).

The sub-assembly is properly installed in the cup-shaped formed casing part (1, 3, 19) when the coil carrier (22, 16, 18) comes into contact with the base (19) of the cup-shaped formed casing part (1, 3, 19). The additional spring element (9) installed between the closure part (2, 8) and the coil carrier (22, 16, 18) is sized so that it is also compressed when the coil carrier (22, 16, 18) and the closure part (2, 8) have reached their final positions.

In a second mode of assembly, the coil carrier (22, 16, 18) may be inserted into the cup-shaped formed casing part (1, 3, 19) first. Then the base (19) of the cup-shaped formed casing part (1, 3, 19) holds the coil carrier (22, 16, 18) as the closure part (2, 8) is forced onto it. In this process, the barbs (24, 34) of the splines (23 and 33) of the closure part (2, 8) catch on the teeth (25 and 32) of the coil carrier (22, 16, 18) as before. Finally, the cup-shaped formed casing part (1, 3, 19) and the closure part (2, 8) snap together as indentations (4) of certain locations of the wall of the cup-shaped formed casing part (1, 3, 19) fall into corresponding recesses in the wall of the closure part (2, 8). The coil carrier (22, 16, 18) is then elastically centered and retained in the housing (1, 19, 3, 2, 8) by the same means as described above in connection with the preferred modes of assembly process.

The additional spring element (9) located between the closure part (2, 8) and the coil carrier (22, 16, 18) may be an elastically deformable element installed either on the coil carrier (22, 16, 18) or on the closure part (2, 8). The additional spring element (9) can also consist of a ring-shaped gel cushion. Elastically deformable elements serving as additional spring elements may furthermore be formed as projections of the closure part (2,8) or of the coil carrier (22, 16, 18). If the additional spring elements project from the closure part (2, 8), recesses are formed on the face of the coil carrier (22, 16, 18) to receive them, and vice versa. These projections and recesses are sized so that the additional spring elements are compressed between the coil carrier (22, 16, 18) and the closure part (2, 8) and thereby hold the coil carrier (22, 16, 18) against the base (19) of the cup-shaped formed casing part (1, 3, 19).

The mass of the coil carrier (22, 16, 18) and the spring forces of the elastic abutments (12, 11 and 29, 30) and the additional spring element (9) or elements are sized so that all of the springs remain under compression during accelerations that occur in normal use. The mass of the coil carrier (22, 16, 18) and the restoring force of the springs are also sized so that the coil carrier (22, 16, 18) does not have resonant vibrations at frequencies that would be excited in normal use.

The coil carrier (22, 16, 18) can also be centered in the radial direction with a spring element in the form of an annular disk surrounding the coil carrier (22, 16, 18). This annular disk is slightly undersized and has a longitudinal slit so that the disk grips the coil carrier (22, 16, 18) elastically and provides a supporting contour. Friction between the wall of the housing (1, 19, 3, 2, 8) and the means for centering the coil carrier (22, 16, 18) also aids in stabilizing its position along the longitudinal axis of the cup-shaped formed casing part (1, 19, 3, 2, 8). The coil carrier (22, 16, 18) may also press against a part attached on or near the base (9) of the cup-shaped formed casing part (1, 3, 19) instead of against the base (9) itself.

Instead of the described splines (22, 33), barbs (24, 34) and teeth (25, 32), means of different design for a positive locking or interlocking connection between the coil carrier (22, 16, 18) and the closure part (2, 8) can also be provided on the closure part (2, 8) and on the coil carrier (22, 16, 18).

Numerous alternative embodiments may be devised by those skilled in the art without departing from the scope of the following claims.

I claim:

1. An arrangement for fixing a position of a coil carrier within a cup-shaped formed casing part between a base of said casing part and a closure part which is attached to said casing part and is located on a side of said coil carrier away from said base of said casing part, comprising at least one spring element located on a circumferential wall of the coil carrier and extending away from said coil carrier at a right angle to a longitudinal axis of said coil carrier and towards a wall of said casing part, wherein said spring element is configured to press against a first limited portion of said wall of said casing part and elastically fixes the radial position of said coil carrier in said casing part, and at least one rigid abutment located on said circumferential wall of said coil carrier and extending away from said coil carrier at a right angle to the longitudinal axis of said coil carrier and towards said wall of said casing part wherein said rigid abutment is configured to press against a second limited portion of said wall of said casing part wherein said rigid abutment and said spring element are located relative to each other on said coil carrier so that said coil carrier is pressed by said spring element in the direction of said rigid abutment.

2. The arrangement of claim 1 wherein said spring element is attached integrally to said coil carrier.

3. The arrangement of claim 1 wherein said rigid abutment is attached integrally to said coil carrier.

4. The arrangement of claim 1 wherein said spring element comprises a ring-shaped disk which surrounds said coil carrier wherein said ring-shaped disk has a supporting and elastic contour, and a slit extending in the direction of the longitudinal axis of the coil carrier.

5. The arrangement of claim 1 further comprising at least one additional spring element located between sides of said closure part and said coil carrier facing each other, said additional spring element pressing said coil carrier away from said closure part and against said base of said casing part, thereby elastically fixing the longitudinal position of said coil carrier.

6. The arrangement of claim 5 wherein said additional spring element is integrally attached to said coil carrier.

7. The arrangement of claim 6 wherein said additional spring element comprises a projection from said coil carrier extending towards said closure part, said projection including an opening or recess.

8. The arrangement of claim 6 further comprising a plurality of additional projections on said coil carrier and serving as additional spring elements.

9. The arrangement of claim 5 wherein said additional spring element is integrally attached to said closure part.

10. The arrangement of claim 9 wherein said additional spring element comprises a projection from said closure part extending towards said coil carrier, said projection including an opening or recess.

11. The arrangement of claim 10 further comprising a plurality of additional projections on said closure part and serving as additional spring elements.

12. The arrangement of claim 1 further comprising interlocking connecting elements located on said coil carrier and said closure part.

13. The arrangement of claim 12 wherein said interlocking connecting elements comprise a raised area on one of said coil carrier and said closure part, and a corresponding depression on the other of said coil carrier and closure part, said raised area and said depression cooperating in the manner of a snap connection.

14. The arrangement of claim 1 wherein said closure part comprises splines on its side facing toward said coil carrier, said splines extending towards said coil carrier and being substantially parallel to the longitudinal axis of said casing part, wherein each of said splines has at least one barb extending at a right angle to said longitudinal axis of said casing part, and wherein said coil carrier comprises teeth which are substantially perpendicular to the longitudinal axis of said coil carrier, said teeth interacting with said barbs of said splines of the closure part element in the manner of a snap connection.

15. The arrangement of claim 1 wherein said spring element and said rigid abutment are integrally attached to a ring-shaped disk which surrounds and is integrally attached to said coil carrier, said spring element and said rigid abutment being located substantially diagonally opposite each other on said ring-shaped disk.

16. The arrangement of claim 1 comprising first and second spring elements as defined in claim 1, and first and second rigid abutments as defined in claim 1.

17. The arrangement of claim 16 wherein said first and second spring elements are adjacent each other, said first and second rigid abutments are adjacent each other, said first spring element is substantially diagonally opposite said first rigid abutment, and said second spring element is substantially diagonally opposite said second rigid abutment.

18. An arrangement for fixing a position of a coil carrier within a cup-shaped formed casing part between a base of said casing part and a closure part which is attached to said casing part and is located on a side of said coil carrier away from said base of said casing part, comprising a ring-shaped disk which surrounds said coil carrier, said ring-shaped disk including at least one spring element extending away from said coil carrier at a right angle to a longitudinal axis of said coil carrier and towards a wall of said casing part, and at least one rigid abutment located on said disk substantially diagonally opposite to said spring element, said rigid abutment extending away from said coil carrier at a right angle to the longitudinal axis of said coil carrier and toward said wall of said casing part, wherein said spring element is configured to press against a first limited portion of said wall of said casing part, and wherein said rigid abutment is configured to press against a second limited portion of said wall of said casing part which is substantially diagonally opposite to said first limited portion, so that said spring element and said rigid abutment cooperate to elastically fix the radial position of said coil carrier in said casing part.

19. The arrangement of claim 18 wherein said ring-shaped disk is integrally attached to said coil carrier.

20. The arrangement of claim 19 wherein said spring element comprises a supporting portion attached integrally to said disk, a knob-like projection on a first side of said supporting portion, said knob-like projection pressing against said first limited portion of said wall of said casing part, and a slit on a second side of said supporting portion which is opposite to the first side of said supporting portion.

21. The arrangement of claim 20 wherein said rigid abutment comprises a supporting portion attached integrally to said disk, and a knob-like projection extending from said supporting portion and which presses against said second limited portion of said wall of said casing part.

22. The arrangement of claim 21 which comprises first and second spring elements and first and second rigid abutments as defined in claim 21, said first and second spring elements being adjacent to each other, said first and second rigid abutments being adjacent to each other, said first spring element and said first rigid abutment being substantially diagonally opposite each other, and said second spring element and said second rigid abutment being substantially diagonally opposite to each other.

* * * * *